United States Patent
Chelotti et al.

(10) Patent No.: US 9,200,918 B2
(45) Date of Patent: Dec. 1, 2015

(54) INTELLIGENT DESTINATION RECOMMENDATIONS BASED ON HISTORICAL DATA

(75) Inventors: Brandon Anthony Chelotti, San Mateo, CA (US); Howard Aron Miller, Saratoga, CA (US); Brian Egon Strathmeier, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/416,927

(22) Filed: Mar. 9, 2012

(65) Prior Publication Data

US 2013/0238241 A1    Sep. 12, 2013

(51) Int. Cl.
*G01C 21/36* (2006.01)
*G06Q 10/10* (2012.01)

(52) U.S. Cl.
CPC .......... *G01C 21/362* (2013.01); *G01C 21/3617* (2013.01); *G06Q 10/109* (2013.01)

(58) Field of Classification Search
CPC .. G01C 21/30; G01C 21/362; G01C 21/3617; G01Q 10/109
USPC ......... 701/207, 208, 533; 705/10; 706/11, 14, 706/18, 48; 707/14.64, 14.58; 709/217, 709/245; 415/418; 455/403
See application file for complete search history.

(56) References Cited

U.S. PATENT DOCUMENTS

| | | | | |
|---|---|---|---|---|
| 5,961,571 A * | 10/1999 | Gorr et al. | ..................... | 701/494 |
| 7,333,923 B1 * | 2/2008 | Yamanishi et al. | ................ | 703/2 |
| 7,483,867 B2 * | 1/2009 | Ansari et al. | ..................... | 706/25 |
| 7,528,713 B2 * | 5/2009 | Singh et al. | ............. | 340/539.11 |
| 8,019,834 B2 * | 9/2011 | Horvitz et al. | ................ | 709/217 |
| 8,024,112 B2 * | 9/2011 | Krumm et al. | ................ | 701/423 |
| 8,041,658 B2 * | 10/2011 | Singh et al. | ..................... | 706/14 |
| 8,111,172 B2 * | 2/2012 | Morimoto et al. | ......... | 340/932.2 |
| 8,229,666 B2 * | 7/2012 | Bell et al. | ..................... | 701/400 |
| 8,538,686 B2 * | 9/2013 | Gruen et al. | ..................... | 701/426 |
| 8,930,820 B1 * | 1/2015 | Elwell et al. | .................. | 715/738 |
| 2008/0027639 A1 * | 1/2008 | Tryon | .......................... | 701/209 |
| 2008/0051977 A1 * | 2/2008 | Tryon | .......................... | 701/103 |
| 2008/0162387 A1 * | 7/2008 | Singh et al. | ..................... | 706/14 |
| 2009/0055238 A1 * | 2/2009 | Baryshnikov et al. | ............ | 705/8 |
| 2010/0077020 A1 * | 3/2010 | Paloheimo et al. | ............ | 709/203 |
| 2010/0161166 A1 * | 6/2010 | Yamada et al. | ................ | 701/22 |
| 2010/0168994 A1 * | 7/2010 | Bourque et al. | ............. | 701/200 |
| 2011/0211813 A1 * | 9/2011 | Marks | ........................... | 386/297 |
| 2011/0302116 A1 * | 12/2011 | Ide et al. | ......................... | 706/12 |
| 2011/0313956 A1 * | 12/2011 | Abe et al. | ........................ | 706/12 |
| 2012/0010805 A1 * | 1/2012 | Wilkerson | ..................... | 701/200 |
| 2012/0130582 A1 * | 5/2012 | Hukkeri | .......................... | 701/25 |
| 2013/0006897 A1 * | 1/2013 | Jain et al. | ........................ | 706/12 |
| 2013/0166096 A1 * | 6/2013 | Jotanovic | .......................... | 701/1 |

* cited by examiner

*Primary Examiner* — Fadey Jabr
*Assistant Examiner* — Aaron L Troost
(74) *Attorney, Agent, or Firm* — Kilpatrick Townsend & Stockton LLP

(57) ABSTRACT

Apparatuses and methods relating to navigation and calendar integration are described. In one implementation, confidence ratings are calculated for one or more destinations. Each destination has an associated confidence rating and confidence ratings are based on a match between the current time and time data for each destination. A destination is selected based on confidence rating and displayed. A calendar event is created based upon the selected destination.

48 Claims, 8 Drawing Sheets

INTELLIGENT DESTINATION RECOMMENDATIONS BASED ON HISTORICAL DATA

FIELD OF THE INVENTION

Embodiments described herein generally relate to navigation and calendaring systems.

BACKGROUND

A navigation device or program typically uses a street address, intersection, or point of interest to provide route and map information to be displayed and/or spoken on mobile device.

Navigation programs require the user to manually enter the destination address or to manually select from a "recent" or "favorites" list in order to begin routing to a destination. "Recent" lists typically include a list of previously visited destinations sorted by most recently visited destination. However, a list of most recently visited destinations may not be a reliable indicator of future destinations. A recently visited destination often is not visited again in a consecutive trip. "Favorites" are manually saved by the user and presented alphabetically. "Favorites" must be manually updated and maintained, and the longer the list, the more difficult it becomes to find a particular "favorite" destination. Therefore, although "recent" and "favorites" lists provide a manual way for users to select a destination for routing, more intelligent destination recommendations and interfaces are needed.

Navigation programs also do not take into account the current mode of transportation when providing destination recommendations. Navigation programs do not estimate which mode of transportation is most relevant to the current situation. Walking or driving modes may be user selectable options that must be manually changed when a different mode is required. Therefore, more efficient detection of the current mode of transportation is needed.

Mobile devices sometimes contain an installed or integrated calendar program. A calendar program stores information about user events, appointments, notes, and reminders for dates throughout a calendar year. While navigation systems allow for the building and use of an itinerary, navigation devices do not modify or suggest updates to a user calendar based on the travel history of a user.

SUMMARY OF THE DESCRIPTION

Methods and apparatuses to operate the navigation and calendar functions of a mobile device are described.

In one embodiment, the memory of the mobile device contains instructions to provide destination recommendations based on time and position data. In one embodiment, destination recommendations are displayed on the mobile device so that a user can select a destination for navigation or routing. In one embodiment, the destination recommendations displayed for selection by a user are sorted by confidence rating.

In one embodiment, confidence rating is a representation of the likelihood that a user will visit the associated destination as the next destination of the mobile device. A destination with an associated high confidence rating indicates a high likelihood that the associated destination will be the next destination. In one embodiment, all known destinations have an associated confidence rating and confidence ratings are calculated when the mobile device detects movement. In one embodiment, after detecting movement, the mobile device automatically selects the highest confidence destination and provides directions to the destination.

In one embodiment, the mobile device is able to estimate the current mode of transportation of the mobile device. In one embodiment, the mobile device is able to recognize a vehicle with a previous connection history to the mobile device. In one embodiment, the mobile device automatically provides directions to an estimated destination when a user approaches a recognized mode of transportation. In one embodiment, a navigation module estimates the mode of transportation of a device and provides intelligent destination recommendations that are relevant to the estimated mode of transportation. For example, upon estimating that a user and mobile device are traveling by train, the user is provided with an offer to route directions to a list of predicted destinations based on the user's past travel pattern. Additionally, relevant information for train riders, such as train schedule, connection information, and designated stops is provided.

In one embodiment, calendar and navigation functionality is integrated on a mobile device and automatically updates a user calendar based on the historical travel patterns of the user. For example, upon determining the user has a historical pattern of going to the gym at 2 pm every Wednesday, the user's calendar is automatically updated to reflect the gym as reoccurring appointment on Wednesdays at 2 pm.

BRIEF DESCRIPTION OF THE DRAWINGS

The present invention is illustrated by way of example, and not by way of limitation, in the figures of the accompanying drawings.

DETAILED DESCRIPTION

Mobile Device Overview

Figure 1:
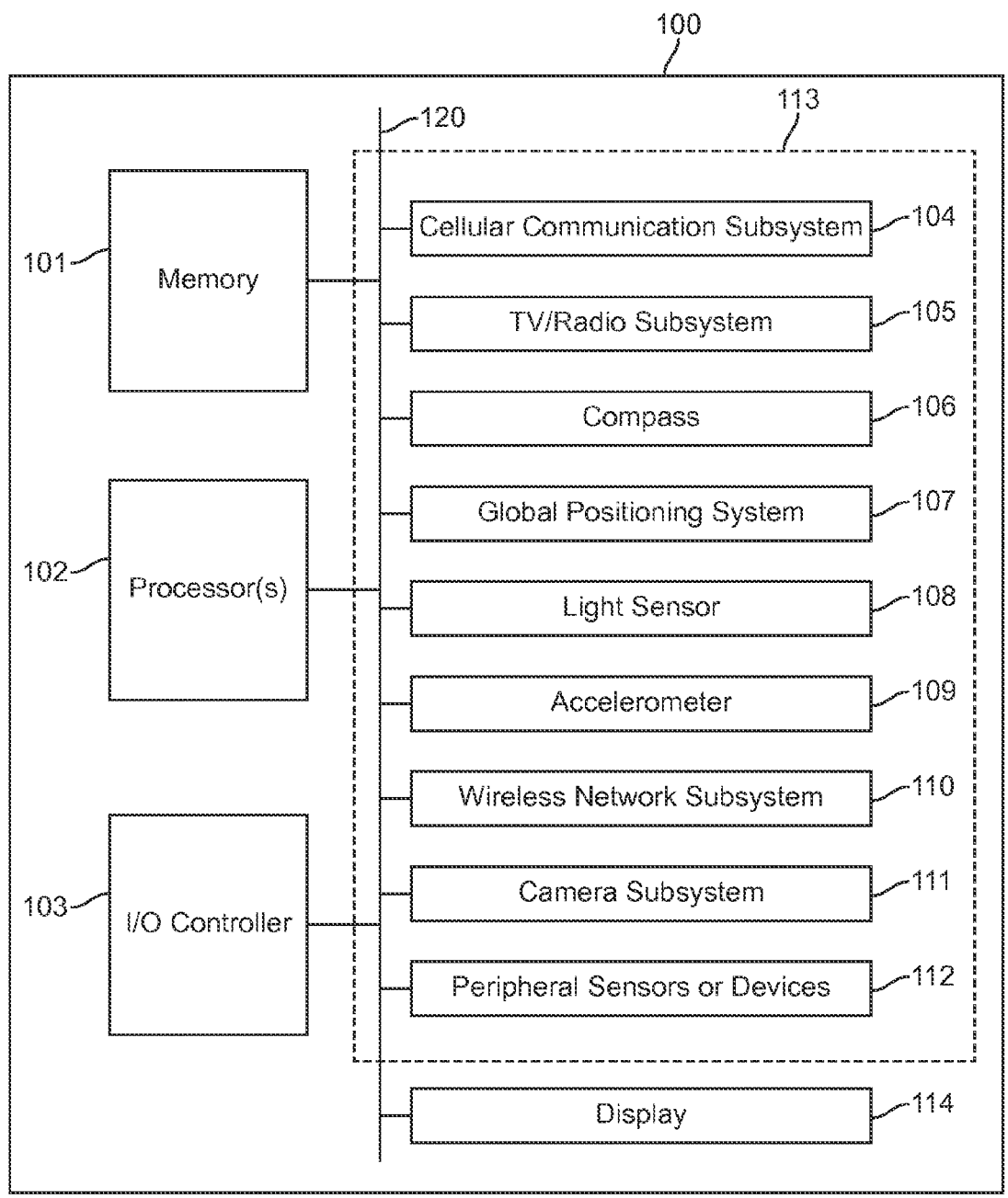
FIG. 1 is a block diagram illustrating an exemplary architecture of a mobile device in which an embodiment of the invention may be implemented.

FIG. 1 is a block diagram of an exemplary mobile device 100 in which one embodiment of an integrated navigation and calendar system is implemented. The mobile device 100 can be, for example, a handheld computer, a personal digital assistant, a cellular telephone, a network appliance, a camera, a smart phone, mobile phone, a media player, a navigation device, an email device, a game console, or a combination of any two or more of these data processing devices or other data processing devices. A mobile device 100 as described is not limited to handheld devices, but may also include devices physically mounted to or incorporated into a mode of transportation (e.g., automobile, motorcycle, or bus).

The mobile device 100 can include memory 101, one or more data processors, microprocessors, microcontroller, image processors, and/or central processing units 102, and a input/output (I/O) controller 103. The term "processor" may refer to a device having two or more processing units or elements, e.g., a CPU with multiple processing cores. The memory 101, the one or more processors 102, and/or the input/output controller 103 can be separate components or can be integrated in one or more integrated circuits. The various components in the mobile device 100 can be coupled by one or more communication buses or signal lines 120.

The mobile device 100 can include one or more input/output (I/O) devices and/or sensor devices. I/O controller 103 couples I/O devices to the mobile device 100. I/O devices are able to receive data as well as provide data. In one embodiment, input-output devices may include user input-output devices, display 114, audio devices (e.g., speaker and microphone), and wireless communications devices. In one embodiment, the display 114 is a touch screen display that can receive input. In some embodiments the mobile device 100 includes an ambient light sensor 108, camera 111, and other sensors. In some embodiments, the mobile device 100 can include circuitry and sensors for supporting a positioning system 113, such as that provided by the global positioning system (GPS) 107, a cellular communication system 104, accelerometer 109, compass 106, television/radio subsystem 105, wireless network 110, or any other technology for determining the geographic location of a device. In some embodiments, a positioning system 113 can be expanded through an external interface (e.g., port/peripheral sensor or device 112) to provide access to other location-based services.

Navigation Operation Overview

Figure 2:
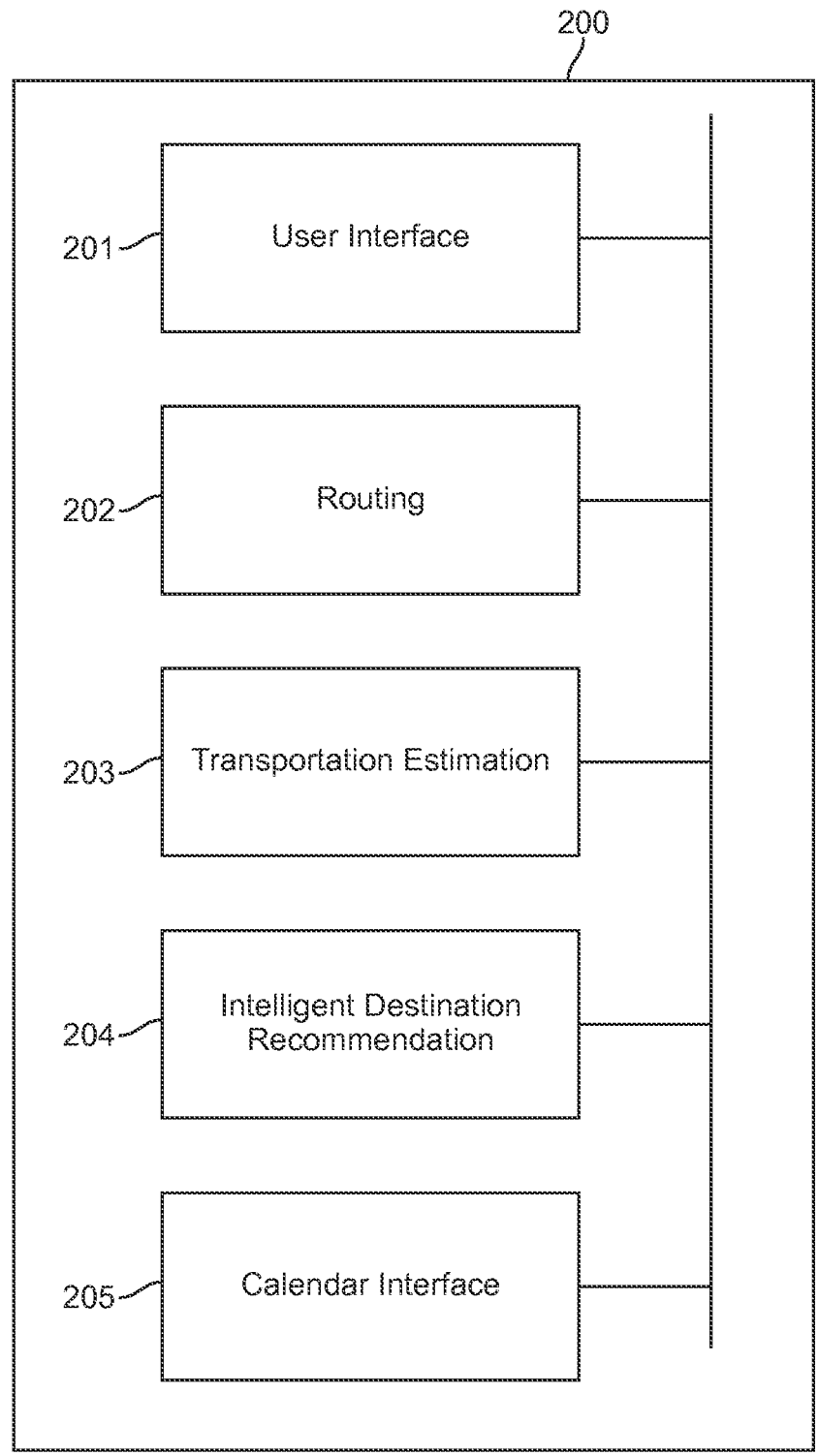
FIG. 2 illustrates the architecture of a Navigation Module, according to one embodiment.

FIG. 2 is a block diagram illustrating an exemplary Navigation Module 200. In one embodiment, the mobile device 100 includes a Navigation Module 200. In one embodiment, the Navigation Module 200 includes one or more of a Routing Engine 202, a User Interface Engine 201, a Transportation Estimation Engine (TEE) 203, an Intelligent Destination Recommendation Engine (IDRE) 204, and a Calendar Interface Engine 205. In other embodiments the Navigation Module's instructions may be implemented as separate software programs, procedures, or modules. In yet other embodiments the Navigation Module's instructions may be implemented as one software program, procedure, or module.

In one embodiment, a Routing Engine 202 can derive a route between two locations using existing routing technology and output the result to the User Interface Engine 201. By way of illustration, Google Maps API is one example of existing routing technology, available from Google, Inc. (Mountain View, Calif.).

In an exemplary embodiment the User Interface Engine 201 provides a user interface for display on the mobile device 100. In one embodiment, the User Interface Engine 201 also receives input from the user, for example via touch or other input.

In one embodiment, the Transportation Estimation Engine 203 estimates the current mode of transportation of a moving mobile device 100. For example, in one embodiment the Transportation Estimation Engine 203 may determine whether the user is in a vehicle, taking mass transportation, or is a pedestrian, as described further below.

In one embodiment, the Intelligent Destination Recommendation Engine 204 determines the likelihood that a user will travel to a previously visited destination (known destination). In one embodiment, the Intelligent Destination Recommendation Engine 204 assigns each previously visited destination with a confidence rating that represents the likelihood that the user (mobile device 100) will travel to the destination.

In one embodiment, the Calendar Interface Engine 205 uses data calculated by the IDRE 204 to create or remove calendar entries in a calendar application, program, or module.

In one embodiment, the Navigation Module 200 is active (able to collect destination data) when the mobile device 100 is able to provide required system resources for the Navigation Module 200 to function. When the Navigation Module 200 is active (e.g., running in the foreground or background), regular collection of location data and regular updating of intelligent recommendations is possible. In other embodiments, the Navigation Module 200 is active only when the user activates the Navigation Module 200.

Figure 3:
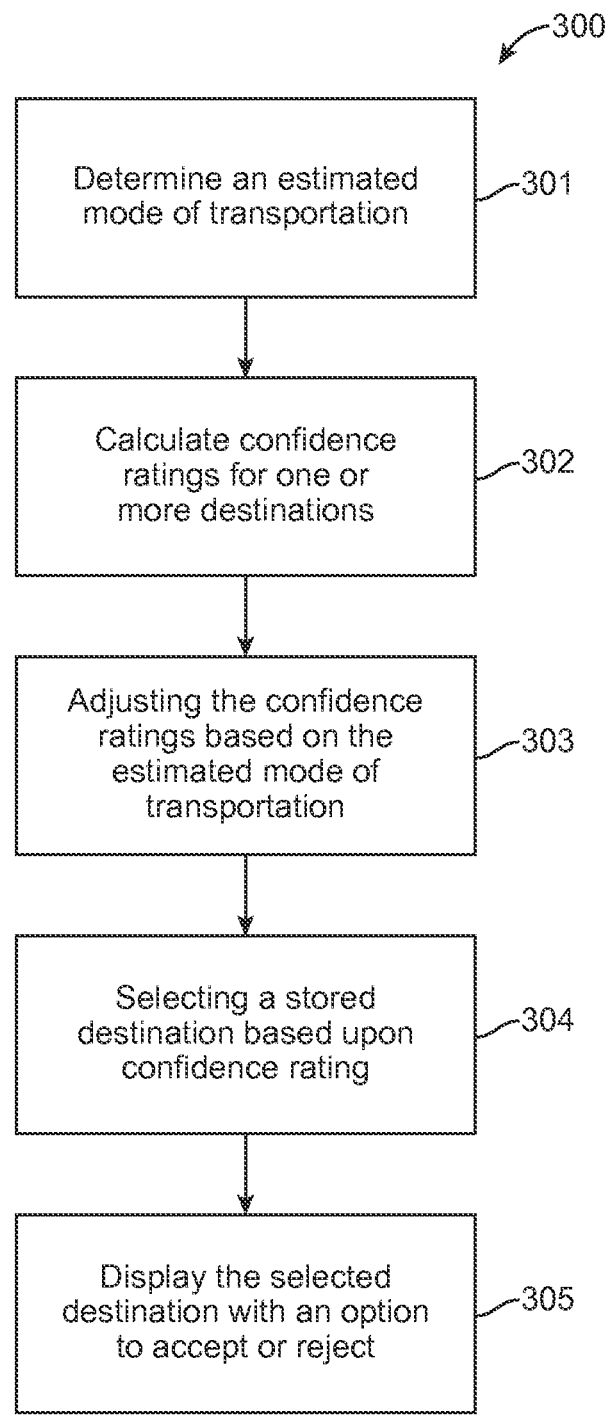
FIG. 3 is a flow chart illustrating the operation of the Navigation Module, according to one embodiment.

FIG. 3 shows a flow diagram of one embodiment of a method 300 for providing intelligent destination recommendations. At block 301, a processing device (e.g., mobile device 100) determines an estimated mode of transportation. In one embodiment, the Navigation Module 200 calls the TEE 203 to determine the mode of transportation.

At block 302, the processing device calculates confidence ratings for one or more destinations. In one embodiment, each destination has a confidence rating and the confidence rating is based on a match between the current time and stored time stamps for each destination. In one embodiment, the Navigation Module 200 calls the IDRE 204 to calculate/adjust confidence ratings based on a match between the current time and stored time stamps for a destination.

At block 303, the processing device adjusts the confidence rating based on the estimated mode of transportation. In one embodiment, the Navigation Module 200 calls the IDRE 204 to calculate confidence ratings based on the estimated mode of transportation.

At block 304, the processing device selects a stored destination based upon a confidence rating. In one embodiment, the IDRE 204 returns a destination recommendation based on one or more of confidence, estimated mode of transport, current location, current time/date, mobile device trajectory, or other factors.

At block 305, the selected destination is displayed in a manner that a user can accept or reject the selected destination. In one embodiment, the Navigation Module 200 calls the User Interface Engine 201 to display an option to accept or reject a selected destination. The selected destination is an estimation of the destination of the mobile device 100.

Transportation Estimation Engine

In one embodiment, a TEE 203 receives notification that the mobile device 100 is moving and begins analysis of the mobile device's movement characteristics. In one embodiment the TEE 203 receives data from the positioning system 113 or other available sensors, to determine movement characteristics. In one embodiment the TEE 203 has access to transportation profiles that contain data representing the unique properties of each mode of transportation. In one embodiment the TEE 203 uses transportation profiles to analyze the movement characteristics of the mobile device 100 and estimate the mode of transportation. If there is a match between the transportation profile and the movement characteristics of the mobile device 100, the TEE 203 will output an estimation of transportation result. In one embodiment, the IDRE 204 receives the transportation result from the TEE 203. In other embodiments, the result can be received and used by various programs or applications on the mobile device 100. In one embodiment, the estimated mode of transportation determined by the TEE 203 can be accessed through an API or plug-in. In one embodiment, the estimated mode of transportation is written to a file or data object that can be accessed by other programs or applications on the mobile device 100 or sent to a device that is external to the mobile device 100.

In one embodiment the mode of transportation is determined to be pedestrian, bicycling, vehicle or mass transportation. Pedestrian transportation, as used herein, includes, walking, jogging, running, and other variations in speed of movement. Vehicle, as used herein, includes automobile, motorcycle, or other forms of personal transportation. Mass transportation, as used herein, includes busses, trains, subways, cable car, monorail, light rail, shuttle, or other forms of public transportation. In other embodiments, a greater level of granularity is defined such that each type of pedestrian, vehicle, and mass transportation can be separately determined. For example, mode of transportation can be determined to be bus or train, instead of mass transportation generally. In one embodiment, modes of transportation using equipment or machines powered by human energy, such as bicycling, skateboarding, skating, skiing, etc. are classified as pedestrian transportation. In other embodiments, modes of transportation using equipment or machines powered by human energy are classified as a vehicle mode of transportation. In one embodiment, travel by Taxi. Shuttle, Bus or similar modes are classified as mass transportation rather than vehicle transportation.

In one embodiment, the TEE 203 has access to a data store of unique transportation characteristics (transportation profiles) for each possible mode of transportation. In one embodiment the transportation profiles include predetermined default values and can be updated with transportation characteristics associated with a particular user of the mobile device 100. For example, a default vehicle profile may include a speed range of 0 to 60 miles per hour as a characteristic unique to the vehicle profile. In one embodiment, the TEE 203 can determine that a user's vehicle travels in a different range (e.g., 0 to 80 miles per hour) and can update the range to more accurately reflect a particular user's vehicle profile. In one embodiment, a transportation profile contains other types of movement characteristics such as range of speed, average trip duration, average speed, average acceleration, and average deceleration.

In one embodiment, patterns in movements of the mobile device 100 can be associated with a particular transportation profile. For example, the pedestrian mode of transportation can be determined in part by the intermittent movements of the mobile device 100 for each step a user takes while the device is with the user (e.g., detected by an accelerometer 109). In one embodiment, a pedestrian profile estimates typical pedestrian movements and can update the profile with the user's unique pedestrian movements.

In one embodiment, the distances traveled for each mode of transportation are saved to memory 101 and associated with a particular transportation profile. In one embodiment, the historical travel distances are accessed by the IDRE 204 and used to make recommendations for destinations. For example, the IDRE 204 may recommend driving or taking mass transportation if a selected destination is farther than what the user has walked before (a historical walking range). In other embodiments, the historical range of a mode of transportation (e.g., user never walks more than 5 miles) can be used to adjust the confidence rating for a destination (e.g., lower confidence rating for locations outside of walking range, as described further below). For example, if the user never takes the train more than 50 miles, destinations farther than 50 miles away from the current location are assigned a low confidence rating (when the mode of transportation is determined to be on a train).

In one embodiment, the TEE 203 can access a remote database with mass transportation schedules and routes to determine if the mobile device 100 is tracking a route and schedule associated with the mass transportation profile. In other embodiments, mass transportation schedules and routes may be locally accessible on the mobile device 100. For example, a train must follow train tracks, and buses generally follow scheduled routes. In other embodiments, the TEE 203 passes the duty of checking route and schedule information to the IDRE 204 (as discussed below). In one embodiment, bus schedules and routes are saved to the mass transportation profile in order to differentiate mass transportation from other modes of transportation. For example, a bus can travel on the same streets as other vehicles, but busses generally travel along specific routes at specific times. In one embodiment, mass transportation profiles include schedules, such as the approximate time of arrival and time of departure of mass transportation on a particular route. In one embodiment, the TEE 203 determines that a mobile device 100 is following a bus route and schedule and selects mass transportation as the mode of transportation. Alternatively, the TEE 203 can use mass transportation routes and schedules to eliminate the possibility that the mobile device 100 is traveling by mass transportation. For example, if the mobile device 100 is traveling on a bus route at 3 AM on a Sunday, when no busses are scheduled, the mobile device 100 determines that the mobile device's mode of transportation is by vehicle, not by mass transportation. As mentioned above, instead of mass transportation, a bus (or other specific type of mass transportation) profile may be provided.

In one embodiment, the TEE 203 presents a request to confirm the mode of transportation to the user. For example, the TEE 203 can allow the user to differentiate between riding a bus and driving a car. In one embodiment, the choice of mode of transportation is offered to the user in the form of list of favorite transportation modes, and the user can select from one of the list provided by the TEE 203. In one embodiment, the user manually enters modes of transportation into the TEE 203. In one embodiment, confirmation of estimated mode of transportation also causes the TEE 203 to update the transportation profiles with updated movement characteristics as described above.

In one embodiment, the TEE 203 determines the mode of transportation is the user's personal vehicle. In one embodiment, the TEE 203 has access to the mobile device 100 connection history and determines that the mobile device 100 is associated with a vehicle. For example, the user may connect the mobile device 100 with the vehicle via Bluetooth™, or similar protocol and the mobile device 100 saves a profile of the connection to memory. In one embodiment, the TEE 203 has access to the mobile device 100 connection history to determine if a connection to a user's personal vehicle is reestablished. For example, some automobiles can recall a prior connection to a user's mobile device 100 and reconnect to the mobile device 100 when the mobile device 100 is within range supported by the connection protocol.

In one embodiment, the TEE 203 automatically records the last location of the user's personal vehicle and determines when the user returns to the recorded vehicle location. For example, the TEE 203 can determine when the user switches modes of transportation and logs the last known location for each mode of transportation. In other embodiments, the user manually records the location of a mode of transportation. For example, after exiting an automobile, a user records the location (e.g., GPS or street address) where the automobile is parked and the TEE 203 recognizes when the user returns the automobile. In one embodiment, approaching the last location for a mode of transportation will automatically cause the TEE 203 to call the IDRE 204 to provide a suggestion for a destination, or start navigating to the highest confidence destination.

Figure 4:
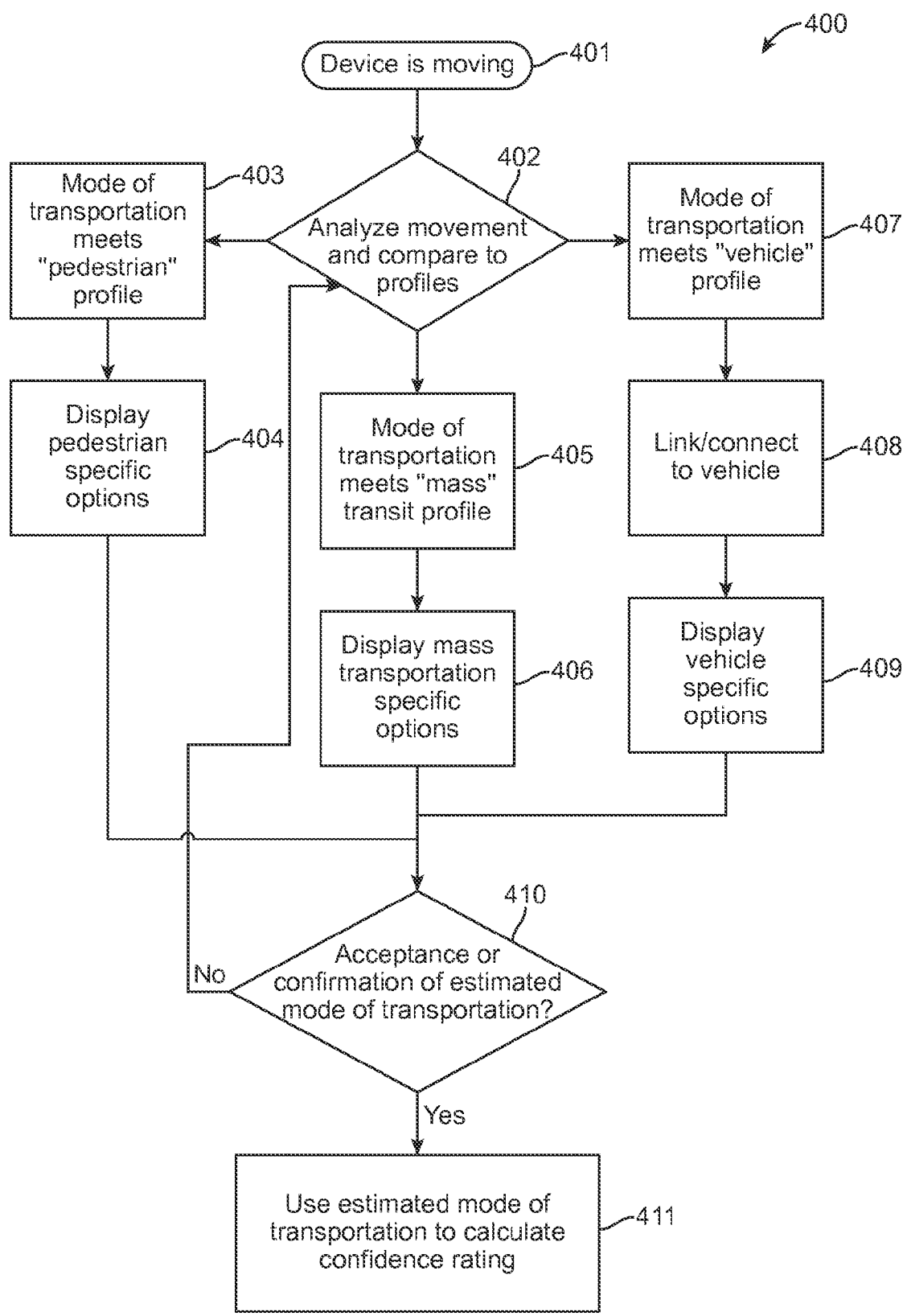
FIG. 4 is a flow chart illustrating the operation of a Transportation Estimation Engine, according to one embodiment.

FIG. 4 is a flow diagram of one embodiment of transportation estimation. At block 401, the mobile device 100 detects movement and begins the process 400 of estimating the mode of transportation (e.g., using the positioning system 113). In one embodiment, the Navigation Module 200 detects movement of the device and calls (triggers) the TEE 203. In other embodiments, the TEE 203 does not require movement to determine mode of transportation (e.g., mode of transportation may be determined by detecting a connection to a vehicle).

At block 402, the movement characteristics of the device are analyzed and compared to a set of transportation profiles. In one embodiment, the TEE 203 makes an attempt to estimate the mode of transportation based on the known transportation profiles and data input from the positioning system 113. In one embodiment, the current movement characteristics are stored temporarily in a current movement profile. In one embodiment, the current movement profile contains at least one of the same type of movement characteristics contained in the transportation profiles (e.g., the current and pedestrian profile both contain an average speed value or field). In one embodiment, transportation profiles include characteristics associated with a particular mode of transportation and are compared to current movement characteristics as described above. In one embodiment, movement characteristics do not have to be an exact match and the profile providing the closest match to the current movement characteristics is chosen. For example, if an average speed as specified in the pedestrian profile is 1.4 miles per hour, the average speed specified in the vehicle profile is 35 miles per hour and the current speed of the mobile device is 3 miles per hour, the pedestrian profile is selected over the vehicle profile. In one embodiment, each type of characteristic in a transportation profile is compared to the current respective movement characteristic (e.g., current acceleration is compared to average acceleration in each profile). In one embodiment, one transportation profile is selected as the closest match to the current profile for each type of characteristic (e.g., average speed). The transportation profile with the highest number of characteristic types (e.g., matching average speed and average acceleration to the current profile are two exemplary characteristic type matches) that match the current profile is selected as the estimated mode of transportation. In other embodiments, other methods for determining the estimated mode of transportation based on transportation profiles and the current profile are possible.

At block 403, the current movement profile of the mobile device 100 is determined to approximately match the pedestrian profile.

At block 404, the mobile device 100 displays pedestrian specific options. In one embodiment, the TEE 203 will display pedestrian specific options (e.g., current and predicted weather, and walking directions).

At block 405, the current movement profile of the mobile device 100 is determined to approximately match the mass transportation profile.

At block 406, the mobile device 100 presents mass transportations specific options. In one embodiment, if the best match is the mass transportation profile 405, the TEE 203 will display mass transportation specific options (e.g., transportation schedules and routes).

At block 407, the current movement profile of the mobile device 100 is determined to approximately match the vehicle profile.

At block 408, the mobile device 100 may optionally offer a connection to the vehicle. In one embodiment, the TEE 203 displays an offer to connect to the vehicle. In one embodiment, the TEE 203 attempts to automatically connect to the vehicle based on a previous connection history. In one embodiment, establishing a connection to a vehicle includes one or more of linking to car navigation or the vehicle computer system.

At block 409, the mobile device 100 displays vehicle specific options. In one embodiment, the TEE 203 displays vehicle specific options such as offering to play/stream audio through a car connection, connecting phone, and offering driving directions.

At block 410, the mobile device 100 detects acceptance or confirmation of an estimated mode of transportation. In one embodiment, the TEE 203 determines whether the user has indicated an acceptance of the transportation estimation. In one embodiment, acceptance is acknowledged when the user manually verifies the estimated mode of transportation. In one embodiment, if an estimated mode of transportation is not accepted or confirmed, the mobile device 100 continues to analyze the movement characteristics and attempts and re-estimate the mode of transportation 402. In other embodiments, the TEE 203 provides fully automatic operation (e.g., automatic estimation and selection of a mode of transportation) and offers the user the option of manually overriding the TEE 203 selection.

At block 411, the mode of transportation is used to calculate confidence rating, as described further below. In one embodiment, the mode of transportation is sent from the TEE 203 to the IDRE 204 for confidence rating calculations. In one embodiment, the mode of transportation also is added to a list of favorite modes of transportation.

Intelligent Destination Recommendation Engine
Overview

In one embodiment, the TEE 203 sends an estimation of the mode of transportation to the Navigation Module 200 or directly to the IDRE 204. In one embodiment, the IDRE 204 estimates the next likely destination of the mobile device 100. In one embodiment, destination estimation is based on destination records and associated confidence ratings. In one embodiment, the IDRE 204 is integrated with a positioning system 113, map(s), time/date system, or other modules and applications of a mobile device 100. In one embodiment, the IDRE 204 can analyze the current path of travel of the mobile device 100 to make an intelligent destination recommendation based on destination records that may lie within the path of travel.

Intelligent Destination Recommendation Engine:
Location Learning

In one embodiment, the IDRE 204 records the current location of the mobile device 100 in increments of time, herein referred to as the polling frequency. In one embodiment, the mobile device 100 uses the date and time functions to create a time stamp for each increment, which provides current time and date information at the moment the time stamp function is called.

In one embodiment, the IDRE 204 has access to the current time and date functions of the mobile device 100 in order to attach a time stamp to a destination record. As used herein, a time stamp includes one or more of, second, minute, and hour information, as well as the date (day, month, and year). In some embodiments, the day of the week (e.g., Monday, Tuesday, etc.) and holiday information is also recorded and stored in a destination record in memory. In other embodiments, the mobile device 100 has access to a calendar function that associates the day of the week and holiday information to the date (e.g., 11/24/2011 is associated with Thursday and is a Thanksgiving Holiday in the United States).

In one embodiment, a destination record contains GPS coordinates or a street address. For example, a destination and time stamp recorded at 1 infinite loop, Cupertino Calif. USA at precisely noon on Nov. 10, 2011, is saved to memory as "12:00:00 11-11-2011 37.33171, −122.030296." In other embodiments, the street address is saved to memory in addition to, or in place of GPS coordinates. In one embodiment, the time stamp and destination data are saved to a database, list, or other data structure, and stored in memory. In one embodiment, the time stamp and destination data are saved to a destination record, such as the exemplary destination record shown in FIG. 6 and described further below.

Figure 5:
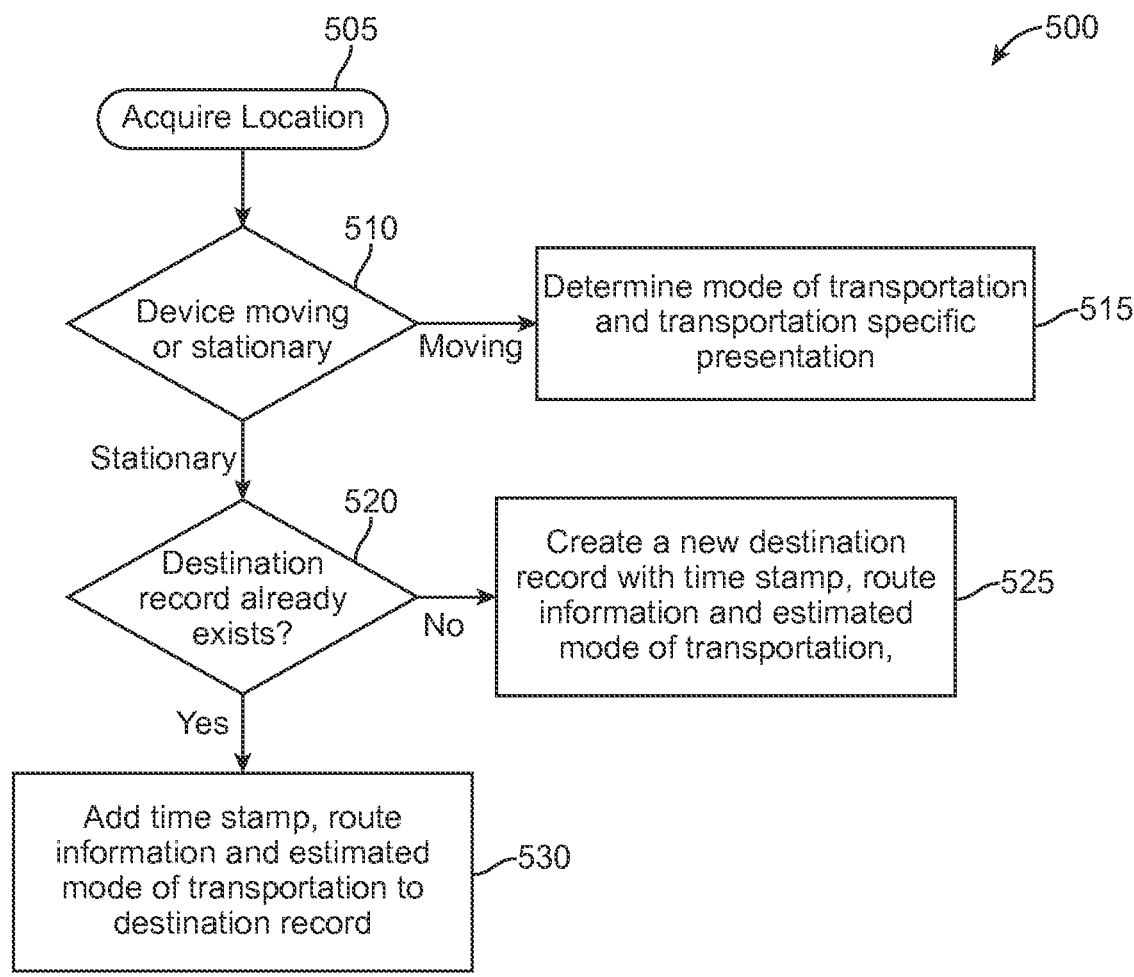
FIG. 5 is a flow chart illustrating a method for learning destinations, according to one embodiment.

FIG. 5 is a flow diagram of one embodiment of a method 500 for destination learning.

At block 505, the mobile device 100 acquires location information (e.g., from one or more sensors in positioning system 113). In one embodiment, the IDRE 204 handles the destination learning for the Navigation Module 200.

At block 510, the mobile device 100 determines whether the mobile device 100 is moving or stationary. In one embodiment, movement is determined by comparing the data from a positioning system 113 at two points in time (e.g., the current GPS coordinates compared to the GPS coordinates associated with a previous recent time). In one embodiment, movement of the mobile device 100 is detected through the monitoring of the mobile device's current environment. In one embodiment, the mobile device 100 is able to detect changes to its present environment by light or image sensors (e.g., a light sensor 108 or camera 111). For example, sensors may detect that mobile device is in a user's pocket because of a constant low light level. A light or image sensor may also detect that there is no change in environment when a mobile device is placed stationary on a desk or in other situations where data received by light or image sensors is held constant. In one embodiment, the camera sensor captures a series of images and compares two or more images to determine if the camera view has changed. In one embodiment, the mobile device 100 is determined to be stationary if no movement is detected after a threshold stationary time (e.g., for a time period longer than 15 minutes). In other embodiments, the threshold stationary time is user adjustable. In other embodiments, the IDRE 204 can learn patterns in the movement of the mobile device 100 and automatically set a threshold stationary time that minimizes false positives. For example, the IDRE 204 is able to differentiate between a momentary pause at a red traffic light (a pause on the way to a destination) versus actual arrival at a destination.

In one embodiment, the mobile device 100 monitors the current I/O connections or network connections to determine if the properties of any connections have changed. A change in the property of any connection to the mobile device 100 can be analyzed by the IDRE 204 to determine if the mobile device 100 is moving. In one embodiment, when the mobile device 100 is connected (paired) with a vehicle, turning the vehicle off or disconnecting (unpairing) is used as one indication that the user has reached their destination. In one embodiment, switching from one network connection to a different network connection determines movement of the mobile device 100. For example, network connections can have unique identifiers or addresses that identify the connection to the mobile device 100. In one embodiment, when a mobile device 100 changes from one connection to a different connection, or the network connection begins to lose signal strength, the IDRE 204 can determine the device has moved from a last known location.

In one embodiment, the IDRE 204 may interpret data from the accelerometer (or other data from the positioning system 113) to determine when the mobile device 100 is stationary and reduce or eliminate a location polling frequency. For example, if the device is set on a desk in an office or home, the IDRE 204 may stop location polling because the accelerometer input indicates the device has not moved. In one embodiment, detection of movement by an accelerometer or other data from the positioning system 113 causes the IDRE 204 to resume or increase its polling frequency of location data.

In one embodiment, a user selects a polling frequency to override the IDRE 204 polling frequency setting and the IDRE 204 performs location polling even though the positioning system 113 indicates the device to be stationary. In some embodiments, the IDRE 204 uses the positioning system 113 in multiple ways to determine movement of the device. For example, the IDRE 204 may use a camera subsystem 111 or light sensor 108 to gather information about the environment of the mobile device 100, such as whether there is any change in environment from the camera sensor's perspective.

At block 515, the mobile device 100 is determined to be moving. In one embodiment, during movement the device determines the mode of transportation and offers transportation specific options (see the description of the TEE 203 above).

At block 520, the mobile device 100 is stationary and determines whether the current location is a known destination. In one embodiment, a known destination is an approximate area around an exact GPS coordinate or address. For example, in one embodiment a ¼ mile radius from a GPS coordinate may be considered one known destination. In other embodiments, the radius is calculated based on the historical profile of the user. For example, if the user works on a large campus/site or plays golf on large course, the IDRE 204 will expand the radius so the campus/site or golf course is considered one unique destination entry.

At block 525, if a destination record does not exist, a current stationary location is added as a new destination record. In one embodiment, when the mobile device 100 first determines a location not represented as an existing destination record, the location is saved to memory 101 as a new destination record. In one embodiment, the time stamp, route information and estimated mode of transportation are attached or associated with the destination record. In one embodiment, the Navigation Module 200 adds destination records that are GPS coordinates. In an alternate embodiment, new destination records are first created as temporary records and expire from the destination record if more than one time stamp is not recorded within a set amount of time (e.g., a user selectable range from 1 day to 1 year). For example, a user may visit a destination and stay for the threshold amount of time to qualify as a destination record, but never return to a location. In one embodiment, destination records with only one time stamp are periodically flushed from the system once a week or once a month (the time period can be user configurable to a wider range of 1 day to 1 year).

At block 530, if the destination record exists, an additional time stamp for the known destination or user favorite is added (e.g., associated with the existing destination record). In one embodiment, multiple time stamps may be associated with a single destination. If the destination has a previous time stamp, a new time stamp is added and associated with the known destination. In one embodiment, the destination record confidence rating is adjusted cumulatively and saved to memory with each additional time stamp. In other embodiments, the confidence rating is computed when the IDRE 204 requests a ranked list of predicted destinations.

Intelligent Destination Recommendation:
Confidence Rating

In one embodiment, the Navigation Module 200 provides intelligent destination recommendations based on confidence ratings. A confidence rating represents the likelihood that a particular destination will be the actual next destination of the mobile device 100. In one embodiment, the IDRE 204 estimates the next destination by assigning confidence ratings to each stored destination record and determines the highest confidence rating destination as the most likely next destination.

In one embodiment, the IDRE 204 has access to all stored or recorded past destination records (e.g., all destinations visited by the mobile device 100) and associated time stamps. In other embodiments, IDRE 204 accesses a period of time within the entire history (e.g., the last month, or last 180 days of records and destinations). In one embodiment, all known destinations stored in the mobile device 100 are associated with a confidence rating and confidence ratings are calculated when the device transitions from a stationary state to a moving state. In other embodiments, confidence ratings are calculated when a map or navigation program is opened or launched. In other embodiments, confidence ratings are calculated when the mobile device 100 is paired or connected with a vehicle. In one embodiment, confidence ratings are calculated each time the IDRE 204 is called to provide a destination recommendation. In one embodiment the confidence rating is a numerical representation of the likelihood that a mobile device 100 will travel to a destination. In one embodiment, the confidence rating is represented as a number or percentage within a possible range from, for example, 0 to 100 percent.

In one embodiment, confidence rating is generated based on one or more prediction factors, such as: time, frequency of visits to a destination, current location, path of travel, mode of transportation, and user overrides. For example, time and frequency of visits to a destination can be combined to provided an estimation of confidence rating (e.g., visiting the gym every Monday at 1 PM generates a confidence rating based on the combination of a match in time and high frequency). In other embodiments, one or more factors may be omitted or substituted.

Figure 6:
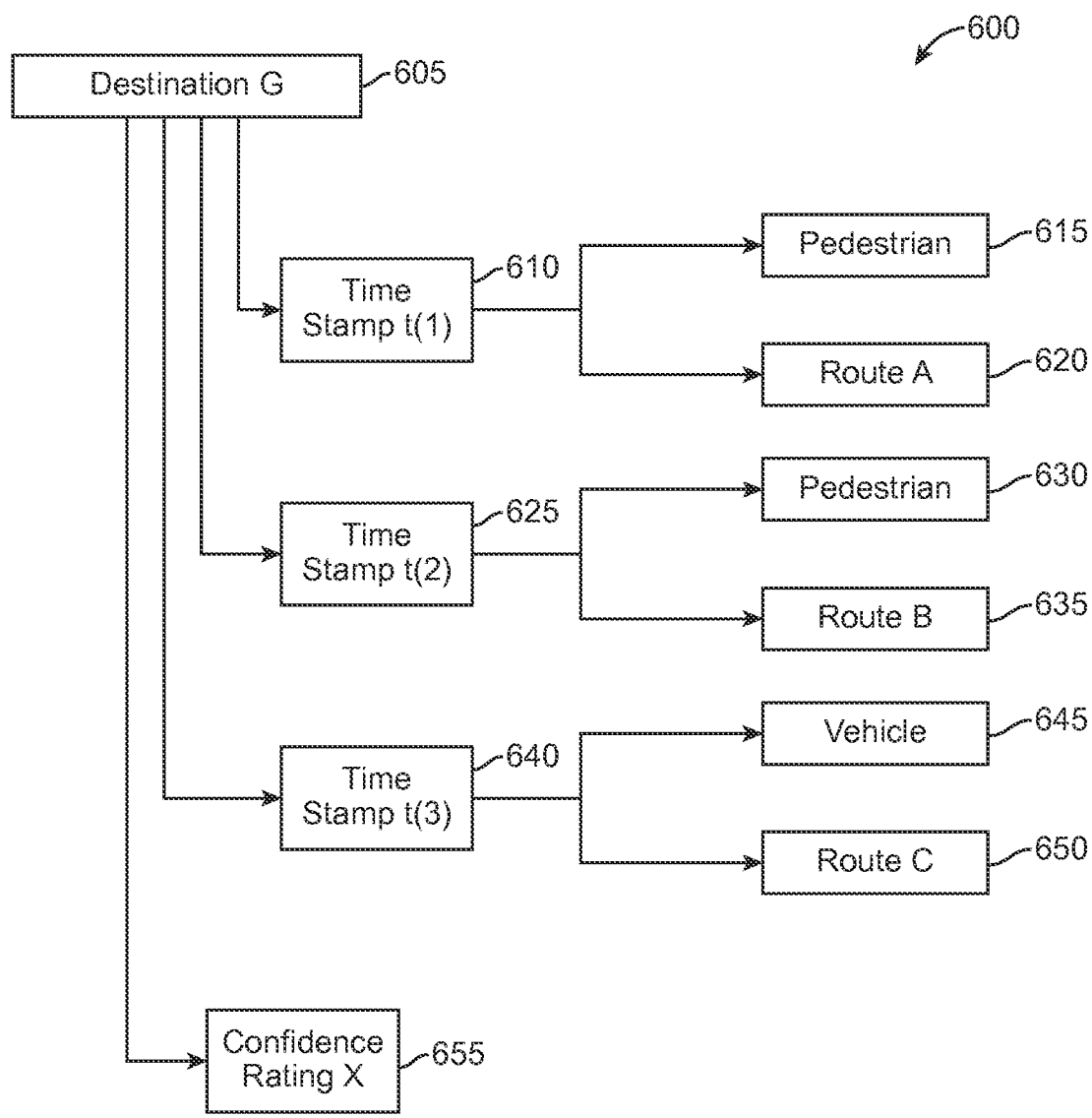
FIG. 6 is an exemplary embodiment of a destination record.

FIG. 6 is an exemplary embodiment of a destination record. In one embodiment, destination record 600 stores a confidence rating and other data associated with Destination G 605. In one embodiment, time stamps t(1) 610, t(2) 625, and t(3) 640 are associated with Destination G 605. In one embodiment, each destination time stamp represents the time mobile device 100 arrived at the destination. In other embodiments, the time stamps associated with Destination G 605 represent the start time of the route to Destination G 605. In yet other embodiments, instead of individual time stamps, destinations are associated with pairs of time stamps (e.g., a window of time) representing the window of time from arrival at a destination until departure from the destination. In one embodiment, each time stamp is associated with a mode of transportation and a route used to reach a destination. Example destination record 600 illustrates that at timestamp t(1) 610, the mode of transportation was determined to be pedestrian 615, and the mobile device 100 traveled along route A 620 to Destination G 605. At timestamp t(2) 625, the mode of transportation was determined to be pedestrian 630, and the mobile device 100 traveled along route B 635. At timestamp t(3) 640, the mode of transportation was determined to be by vehicle 645, and the mobile device 100 traveled along route C 650. Example destination record 600 also contains a confidence rating X 655 that is associated with Destination G 605.

I. Time

In one embodiment, confidence rating is determined based on the current time and the time stamp of previous visits to the destination. For example, an exemplary destination record 600 in FIG. 6 shows a destination record for Destination G 605. The destination record 600 for Destination G 605, shows that the mobile device traveled routes A 620, B 635, and C 650 at times t(1) 610, t(2) 625 and t(3) 640 respectively. In this example, t(1) 610 represents the time stamp for the start of routes A 620 (e.g., Monday 1 PM), t(2) 625 represents the time stamp for the start of route B 635 (e.g., Tuesday 8 AM) and t(3) 640 represents the time stamp for the start of route C 650 (e.g., Wednesday 7 PM). If the current time matches with one or more of the historical stamps associated with Destination G 605 (e.g., t(1) 610, t(2) 625, and t(3) 640), the confidence rating 655 for Destination G 605 is increased.

In one embodiment, the IDRE 204 adjusts the confidence rating based on the current time and time stamps associated with past destination visits. In one embodiment, the IDRE 204 compares each destination time stamp to the current time and increments a destination match counter if the destination time stamp and current time is an approximate match. In one embodiment, the destination record with the most matches receives an increase in confidence rating. In one embodiment, any entry with one or more matches receives an increase in confidence rating, and the more matches the destination has the greater the increase in confidence rating. In one embodiment, having no matches decreases a destination's confidence rating.

In one embodiment, a match to a time stamp is approximate such that a range, herein referred to as a matching window, is considered a match for the purposes of adjusting a confidence rating. In one embodiment, the matching window may be a range of hours or days. For example, going to the gym on Tuesday at 2 pm may be a match with a going to the gym on Wednesday at 1 pm, because the two times are within a window of 1 to 2 days apart. In one embodiment, the closeness in proximity of the match in time stamp to the current time determines the value of the increase or decrease in confidence rating (e.g., an exact match providing the greatest increase in confidence rating, whereas inexact matches provide a lesser increase in confidence rating). In one embodiment; all time stamps in every destination record 600 are compared to the current time and date to determine a top match.

In one embodiment, a second window called a destination time window represents the period of time the device is stationary at a destination. In one embodiment, a destination time window has a minimum a threshold value. For example, time spent waiting at a stoplight would not be considered part of a destination time window, and would instead be considered part of the route to a destination. In one embodiment, the IDRE 204 compares the current time with destination time windows recorded for each known destination and used as part of the confidence rating calculation. In one embodiment, the length of time spent at a destination is recorded in the destination record 600. In other embodiments, time stamps are recorded in pairs, to indicate the start time at a destination and the departure time from a destination.

In one embodiment, the IDRE 204 tags time stamps with additional distinguishing characteristics such as whether the time stamp falls on a holiday, weekend, or weekday. When two time stamps are close in time and also share distinguishing characteristics, the confidence rating is further increased (or decreased in the alternate case where time and additional distinguishing characteristics are different). In one embodiment, the IDRE 204 accounts for historical patterns in the timing of visits to destinations in combination with one or more of the date, current location, starting location, etc.

II. Frequency of Visits

In one embodiment, the IDRE 204 adjusts the confidence rating based on the frequency of visits to a destination. For example, the more visits to a destination, the higher the frequency count. In one embodiment, the frequency of visits to a destination is calculated by totaling the time stamps for a destination record. In one embodiment, higher frequency counts for a destination will result in a higher confidence rating, all other factors being equal.

III. Distance

In one embodiment, the IDRE 204 will use the distance from current location as a factor to determine the confidence rating of a predicted destination. In one embodiment, the IDRE 204 will use the current location to determine the distance to all stored destinations. The greater a destination's distance from the current location the lower the confidence rating. In one embodiment, the current location and distance to known destinations are compared to the historical travel range of the user. For example, while on vacation in different state, the user is unlikely to travel to a gym near the user's home.

IV. Current Path of Travel

In one embodiment, the IDRE 204 uses the positioning system 113 to determine the current path of travel (trajectory) compared to the route to each known destination. In relation to confidence rating, a current path of travel is either positive or negative related to each known destination. Positive current path of travel leads towards an associated known destination. Negative current path of travel leads away from an associated known destination. Positive current path of travel increases an associated destination's confidence rating, whereas negative current path of travel decreases an associated destination's confidence rating. The more direct the current path of travel towards or away from a known destination, the greater the adjustment in confidence rating for an associated destination. For example, around lunchtime during a workweek, a user either travels north and takes a freeway to eat at a restaurant or travels south by streets to go to the gym. In this simplified example, when the path of travel is north by freeway, the restaurant will receive a confidence rating increase and the gym will receive a confidence rating decrease. In one embodiment, current path of travel includes more than just compass direction (e.g., the path can include the entire route from one point to the destination). In one embodiment, the destination record includes the route taken for each historical time stamp. For example, in the exemplary destination record of FIG. 6, mobile device 100 used routes A 620, B 635, and C 650 to travel to Destination G 605 at times t(1) 610, t(2) 625 and t(3) 640 respectively. In this example, t(1) 610 represents the time stamp at the start of route A 620 (e.g., Monday 1 PM mobile device arrived at the destination G), t(2) 625 represents the time stamp at the start of route B 635 (e.g., Tuesday 8 AM) and t(3) 640 represents the time stamp at the start of route C 650 (e.g., Wednesday 7 PM). In alternate embodiments, the time stamps represent the time at end of the route to the destination. If the current path of travel matches with historical routes A 620, B 635, or C 650, the confidence rating 655 for destination G 605 is increased.

In one embodiment, the current or starting location is taken into account when determining the current path of travel and adjusting confidence ratings. In one embodiment, current or starting location and destinations are paired and a pattern of paired matches is used to adjust confidence rating. For example, if the user goes to gym A when traveling from work, and gym B when traveling from home, then when a user's current or starting location is work, gym A will receive an increase in confidence over gym B.

V. Estimated Mode of Transportation

In one embodiment, the estimated mode of transportation is a factor in determining the confidence rating for a known destination. In one embodiment, the mode of transportation used to reach each known destination is recorded with the destination record. For example, Destination G 605 has two associated different modes of transportation, pedestrian 615, 630 and vehicle 645. In one embodiment, a match between the current estimated mode of transportation and a previous mode of transportation associated with a known destination increases the confidence rating of the known destination. For example, if the user historically takes the train to his/her grandmother's house, the bus to school, a car to work, and a bicycle to the gym, those respective destinations will receive an increase in confidence when the matching mode of transportation is determined. For Destination G 605, the user traveled via pedestrian transportation twice and via vehicle transportation once. Therefore if it is determined that the current mode of transportation is pedestrian, Destination G 605 will receive a larger increase in confidence rating than if the current mode of transportation is mass transportation (a transportation that the user has never used to travel to Destination G 605).

In one embodiment, each estimated mode of transportation has an associated distance traveled that represents the furthest distance traveled for the associated mode of transportation. Known destinations outside of a historical distance traveled receive a reduction in confidence rating. Known destinations inside a historical distance traveled radius receive an increase in confidence rating. For example, if the mode of transportation is determined to be walking, destinations outside of the user's historical walking range will have a reduced confidence rating and destinations within the user's historical walking range will have an increased confidence rating. In one embodiment, the user is able to set a range of travel for each mode of transportation.

VI. User Overrides

In one embodiment, the IDRE 204 will override a calculated confidence rating if the user selects or rejects a predicted destination. For example: if a list of predicted destinations are provided to the user and the user bypasses the list to manually enter a destination, the confidence ratings for all items in the displayed list are reduced for future recommendations. In one embodiment, the rejection of a predicted destination may be explicit, and the user indicates that a predicted destination is not applicable. In one embodiment, the rejection of an estimated destination is implicit, for example, bypassing the list of estimated destinations to manually enter a destination. In both implicit and explicit rejection of recommended destinations, the confidence ratings are reduced. Alternatively, when a user confirms a recommended destination, the confidence rating is increased. In one embodiment, user overrides are saved to the destination record and used in future confidence rating calculations.

User Interface Engine

In one embodiment, the User Interface Engine 201 receives the output from the Navigation Module 200 to display on the mobile device 100. In one embodiment, the User Interface Engine 201 passes on commands from the mobile device 100 (e.g., input from a touch screen, physical button, audio command, or other device input) to the other engines in the Navigation Module 200.

Applications and modules can run/execute in the foreground or the background on a mobile device 100. When an application or module is running in the foreground of a mobile device 100, the mobile device 100 displays at least a portion of the application or module interface prominently so that a user has direct access to the user interface. When an application or module is running in the background of a mobile device 100, the application or module is able to perform calculations and obtain input, however the user interface may be hidden from user view. The user interface remains hidden until the application or module is brought to the foreground. While operating in the background, an application or module is still able to collect data from the mobile device 100 and the positioning system 113.

In one embodiment, the Navigation Module 200 operates in the background of the mobile device 100 until the Navigation Module receives a trigger. In one embodiment, the Navigation Module 200 is triggered when one or more of a manual request is received, threshold confidence is reached, or proximity to a recognized mode of transportation is detected.

In one embodiment, the User Interface Engine 201 displays the current estimated mode of transportation on the display of the mobile device 100. In one embodiment, the User can verify, reject or override an estimated mode of transportation by clicking, touching or otherwise interfacing with the mobile device 100.

I. Manual Trigger

In one embodiment, the Navigation Module 200 initiates the User Interface Engine 201 when a user initiates the Navigation Module 200. Initiating the Navigation Module 200 includes, clicking an application/program icon, running an application/program, navigating to a uniform resource identifier, speaking a voice command, using a touch screen to select an application/program, and other known methods for starting or recalling an application or program.

II. Threshold Trigger

In one embodiment, the Navigation Module 200 initiates the User Interface Engine 201 automatically when a confidence rating for a predicted destination reaches a threshold value. In one embodiment, if confidence rating does not reach a threshold value, the Navigation Module 200 continues to operate in the background of the mobile device 100 and the Navigation Module 200 user interface is not displayed.

In an exemplary embodiment that uses a confidence range from 0 to 1, a high confidence level is met when the highest confidence rating is greater than or equal to 0.60. When the record with the highest confidence rating is less than 0.60 the Navigation Module 200 is considered to have a low confidence in estimating a destination and waits until confidence levels increase before displaying a recommendation to the user or automatically routing a destination.

In one embodiment, the Navigation Module waits until after confidence ratings are calculated to determine if the threshold is met. In an exemplary embodiment, the Navigation Module 200 continuously monitors the destination records and confidence ratings and determines when the record with the highest confidence rating meets the threshold requirement. In one embodiment, the Navigation Module 200 will recalculate confidence ratings and notify the User Interface Engine 201.

In one embodiment, when the record with the highest confidence rating meets the high confidence level threshold the Navigation Module 200 begins routing to the destination in the background and displays an offer to show routing to the selected destination. In one embodiment, the mobile device 100 displays a program or application (different than the Navigation Module 200) and overlays the offer to show routing on top of the program or application's display. Routing before the user actually selects a destination speeds up the process of navigation for cases when the user eventually requests the routing to the selected destination. When the user confirms the destination, the User Interface Engine 201 displays the routing and/or map on the mobile device 100 and the Navigation Module 200 is brought to the foreground of the mobile device 100. In one embodiment, after a set amount of time if the Navigation Module 200 fails to receive destination confirmation, the User Interface Engine 201 automatically displays the destination routing. In one embodiment, the set amount of time for confirmation is user configurable in a range of 60 seconds to 1 hour. In other embodiments, a user configurable setting determines whether to allow offers to show routing to a selected destination. For example, a custom setting can disallow offers to show routing unless navigation assistance is requested (e.g., by opening a navigation program, opening a map, or otherwise asking the mobile device 100 for location/directions).

Figure 7:
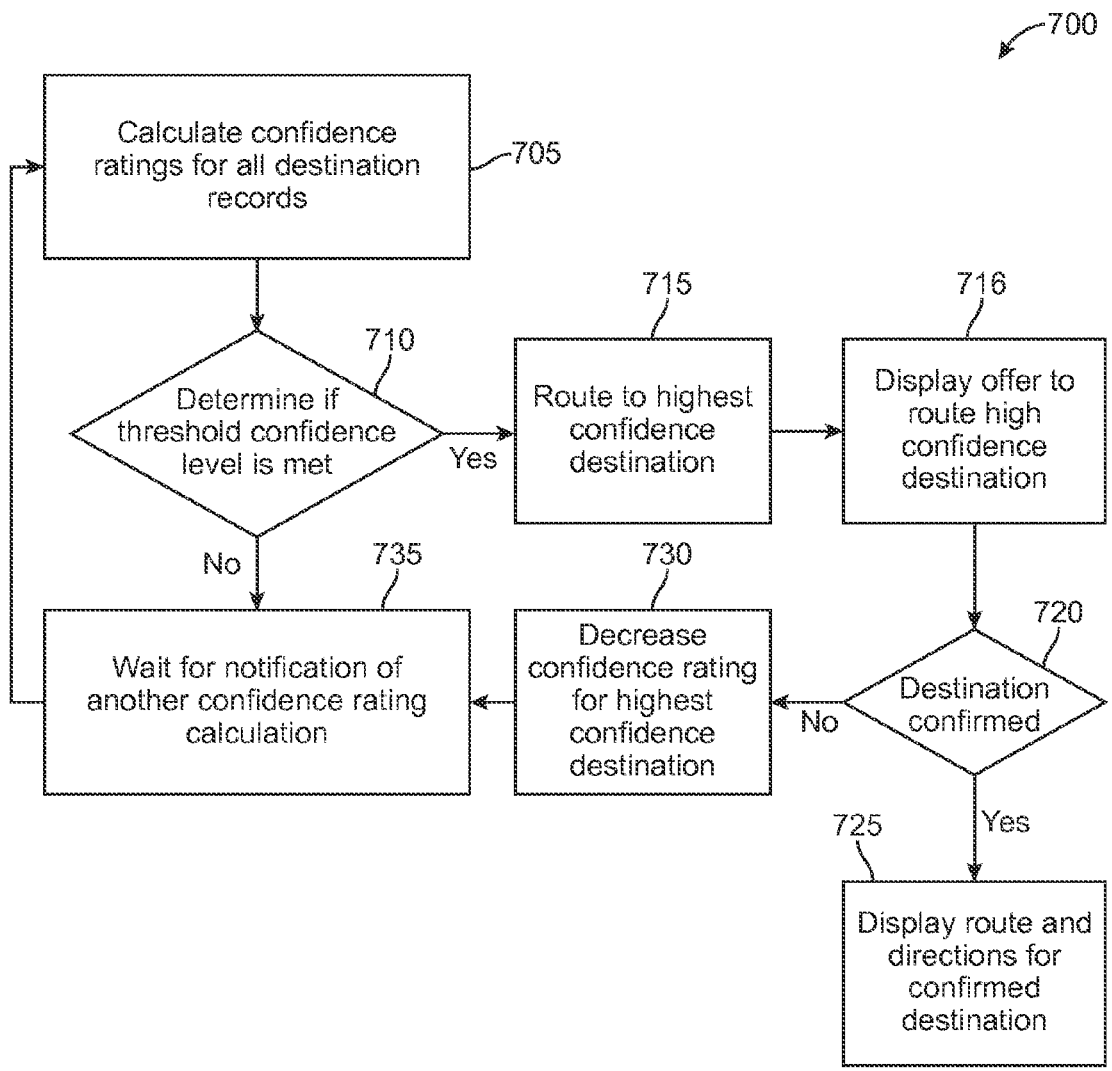
FIG. 7 is a flow chart illustrating a method for estimating a mode of transportation, according to one embodiment.

FIG. 7 is a flow chart of one embodiment of a method 700 for triggering the display of a destination recommendation. At block 705 confidence ratings are determined for all stored destinations. In one embodiment, the IDRE 204 determines confidence ratings for all destination records.

At block 710, the destination with the highest confidence rating is compared with the threshold rating to determine if the high confidence threshold is met. In one embodiment, the IDRE 204 compares the confidence rating of the highest confidence destination record with the threshold rating to determine if the high threshold is met.

At block 715, if the destination with the highest confidence rating meets the high confidence threshold, the mobile device 100 begins calculating the route to the destination. In one embodiment the Routing Engine calculates the route to the destination as a background operation on the mobile device 100.

At block 716 the mobile device 100 displays an offer to navigate to the destination meeting the high confidence threshold. In one embodiment, the User Interface Engine 201 displays an offer to navigate (display the route directions) to the high confidence destination. In one embodiment, the display can be in the form of a pop up window, a message notification, an audio prompt, a switch to the navigation main screen, drop down menu, or type of user prompt for information. In other embodiments, a list of destinations sorted by confidence rating is displayed. In one embodiment, destinations above the high confidence threshold are sorted by confidence rating and displayed.

At block 720, the offer to navigate is accepted or rejected. In one embodiment, the User Interface Engine 201 determines an input is detected that accepts or rejects the offer to navigate to the highest confidence destination.

At block 725, if the highest confidence destination is confirmed, the routing calculation 715 is displayed on the mobile device 100. In one embodiment the User Interface Engine 201 displays the routing information or provides audio routing (e.g., device spoken turn by turn guidance). In other embodiments, the highest confidence destination does not need to be explicitly confirmed with a direct user action. After a timeout period, the User Interface Engine 201 can automatically display the route and directions to the destination. In one embodiment, the timeout period is user configured or can be turned off completely.

At block 730, if the high confidence destination is rejected, the confidence rating associated with the destination is reduced. In one embodiment, the User Interface Engine 201 determines that the estimated destination was rejected and sends a notice to the IDRE 204 to decrease the confidence rating for the destination.

At block 735, if the highest confidence destination is below the low confidence threshold, or a high confidence destination was rejected, method 700 waits until the next time confidence ratings are recalculated. In one embodiment, a request to recalculate confidence ratings returns method 700 to block 705.

III. Proximity Trigger

In one embodiment, the User Interface Engine 201 is launched automatically when the TEE 203 determines the mobile device 100 is within a close proximity to a mode of transportation (e.g., mobile device 100 is able to connect to the vehicle, or approaches last known location of vehicle). In other embodiments, the User interface Engine 201 is launched automatically when a mode of transportation is determined (e.g., as described above).

IV. Presentation of Recommended Destinations

In one embodiment, the IDRE 204 provides a list of predicted destinations to the User Interface Engine 201 and the User Interface Engine 201 displays the list on the mobile device 100. The User Interface Engine 201 provides a list of destination recommendations to the user in a way that a user selects a destination from the list. In one embodiment, an option to reject all of the destination recommendations is provided. In one embodiment, the list of predicted destinations is sorted by confidence rating. In one embodiment, an entry on the list is selected by highlighting the entry or touching the entry (if the mobile device 100 has a multi-touch sensitive display). In one embodiment, the mobile device 100 accepts and responds to voice/speech commands. In one embodiment, a map is generated and displayed in response to the user selection and the display shows and/or speaks a route from the current location of the mobile device 100 to the user selected destination. The user can also be provided the map and route information automatically, as described above. In one embodiment, after the user selects a destination, the User Interface Engine 201 provides map and route information displaying a route superimposed on a map from the current location of the mobile device 100 to a selected destination. In one embodiment, the user does not need to select a destination, the destination is selected automatically and the routing information and map is displayed. In one embodiment, the user is presented with routing information and time of arrival. In one embodiment, the user is presented with an option to display a map of the determined route.

In one embodiment, the confidence rating is hidden from the user and not displayed by the User Interface Engine 201. In other embodiments, the confidence ratings are displayed in a ranked list in addition to a destination description. In one embodiment, confidence ratings are displayed as a percentage (e.g., 90% or 0.90).

In one embodiment, if the mode of transportation is determined to be walking, and the user selects a destination outside of the user's historical walking range, the User Interface Engine 201 provides a recommendation that the user consider an alternate mode of transportation. In one embodiment, the mobile device 100 updates the walking range when an alternate mode of transportation is ignored or rejected. In one embodiment, the User Interface Engine 201 has access to mass transportation schedules, mass transportation connection information as well as designated stops along a route. In one embodiment, the User Interface Engine 201 accesses mass transportation schedules, connection information and designated stops and provides recommendation for a mass transportation route to the user.

In one embodiment the User Interface Engine 201 communicates with a map application. In some embodiments, a map application can be provided, for example, by a navigation program, module or service. In other embodiments, the map application can access maps stored locally on the mobile device 100. The User Interface Engine 201 can use the map provided by the map application to display route information on the mobile device 100. In one embodiment, the Navigation Module 200 can present the estimated navigation times associated with alternative routes to the user through the User Interface Engine 201.

It should be noted that other manners of interacting with a user interface, including the user input required and/or the order of the user input is possible, and the descriptions above are examples only for illustrative purposes.

Location and Calendar Integration

In one embodiment, calendar integration is achieved through a Calendar Interface Engine 205 (CIE). In other embodiments, a Navigation Module 200 will communicate directly to a calendar application.

A calendar includes information about events on different dates in the calendar, including appointment information, notes and/or reminders. In one embodiment, the Navigation Module 200 automatically creates entries in a user calendar, the entries marking the status of the user for a particular time entry. In one embodiment the Navigation Module 200 creates calendar entries which display a user as "likely available", "likely unavailable", "available", and "unavailable." In other embodiments, the Navigation Module 200 can also display "free", "tentative", and "busy" status options in addition to or instead of the previously mentioned calendar entries.

In one embodiment, the Calendar Interface Engine 205 uses the estimated mode of transportation to adjust calendar entries and an availability status associated with the user. In one embodiment, the CIE 205 changes or creates a calendar entry to indicate "STATUS—traveling by MODEOFTRANSPORTATION" where MODEOFTRANSPORTATION is replaced with the current estimated mode of transportation and status is replaced by one of the above mentioned calendar entries or status options. In one embodiment, the status indicated by the CIE 205 is user configurable and can be automatically associated with particular modes of transportation. For example, the user can indicate they are "available for phone calls" when traveling by Taxi, Bus, Train, Shuttle or other mode of transportation. In other cases, a user can configure their status to represent that they are not available to take phone calls while on a Bus, or Train, but can take phone calls when traveling by Taxi. In one embodiment, the status is user configured to any customized status message and can be automatically associated with one or more modes of transportation so that the status message is automatically displayed when the user is traveling by a particular mode of transportation. For example, when the CIE 205 receives indication that the user is traveling by a particular mode of transportation, the CIE 205 determines if any status message is associated with the mode of transportation. If a mode of transportation has an association with a status message, the message is displayed as a calendar entry while the user is traveling.

A user can share the calendar so that it may be viewed by a select group of people or set the calendar to be seen by every other user. For example, the user can share their calendar with co-workers or family members instead of all other users. Shared users can see the description of a users calendar entries or the description of calendar entries unless the entries are "ghosted out." Where the user's calendar entries are ghosted out, shared users view a user's block of time as occupied, but cannot determine what particular appointment details are associated with the block of time. For example, a doctors appointment at 4 pm to 5 pm is displayed to shared users as a 1-hour block of time when the user is "unavailable" and shared users are not able to discern the specifics of the unavailable time block.

In one embodiment, calendar data is read as input into the IDRE 204. For example, a calendar entry for "Gym at 12:00 PM on Tuesday, Nov. 1, 2010" contains the physical location of the gym: 1100 Workout Lane, Healthyville, Calif. In the previous example, a destination record is created for the gym and a time stamp is created for the appointment on Tuesday. In one embodiment, when a calendar entry does not contain an address, the IDRE 204 will attempt to retrieve an address from the user's address book, or query a directory, e.g., the Yellowpages online, to determine an address. Other techniques can be used to determine an associated address.

In one embodiment, in response to a user selecting a destination for routing, the User Interface Engine 201 displays an option to add the selected destination and time as an appointment to the user calendar. In one embodiment, the Calendar Interface Engine 205 automatically adds appointments to the user calendar when patterns are detected, as described below. Other techniques of adding a destination and time selection to a calendar entry are also possible. In one embodiment, the estimated mode of transportation is added to the calendar entry as an additional detail, note or in the subject.

In one embodiment the calendar receives a request from the IDRE 204 to modify a calendar entry to the calendar. In one embodiment, the IDRE 204 will create tentative calendar entries for destinations if the confidence ratings reach a threshold value. In one embodiment, calendar entries suggested for addition by the Navigation Module 200 are added as tentative calendar entries until the user confirms their addition. In one embodiment, a user accepts tentative calendar entries to convert the tentative entries into scheduled events or appointments.

In one embodiment, the IDRE 204 analyzes a span of time for all destination records to determine patterns that are candidates for tentative calendar entries. A span of time may be days, months, years or the entire destination history recorded on the mobile device 100. In one embodiment the user selects the time span for analysis. In one embodiment, the IDRE 204 analyzes the user's historical pattern of destinations to create tentative calendar entries for future events not already scheduled in the calendar. For example, the IDRE 204 may determine the user goes to a coffee shop every Wednesday at 2 PM and a high confidence rating will be associated with the coffee shop every Wednesday at 2 PM. In one embodiment, the IDRE 204 will project confidence ratings into future dates and determine if tentative calendar entries should be created or recommended.

In one embodiment, the IDRE 204 automatically determines from a historical pattern, a user's commute between home and work. Blocks of time designated as travel between home and work are designated with a tentative calendar entry of "likely unavailable."

Figure 8:
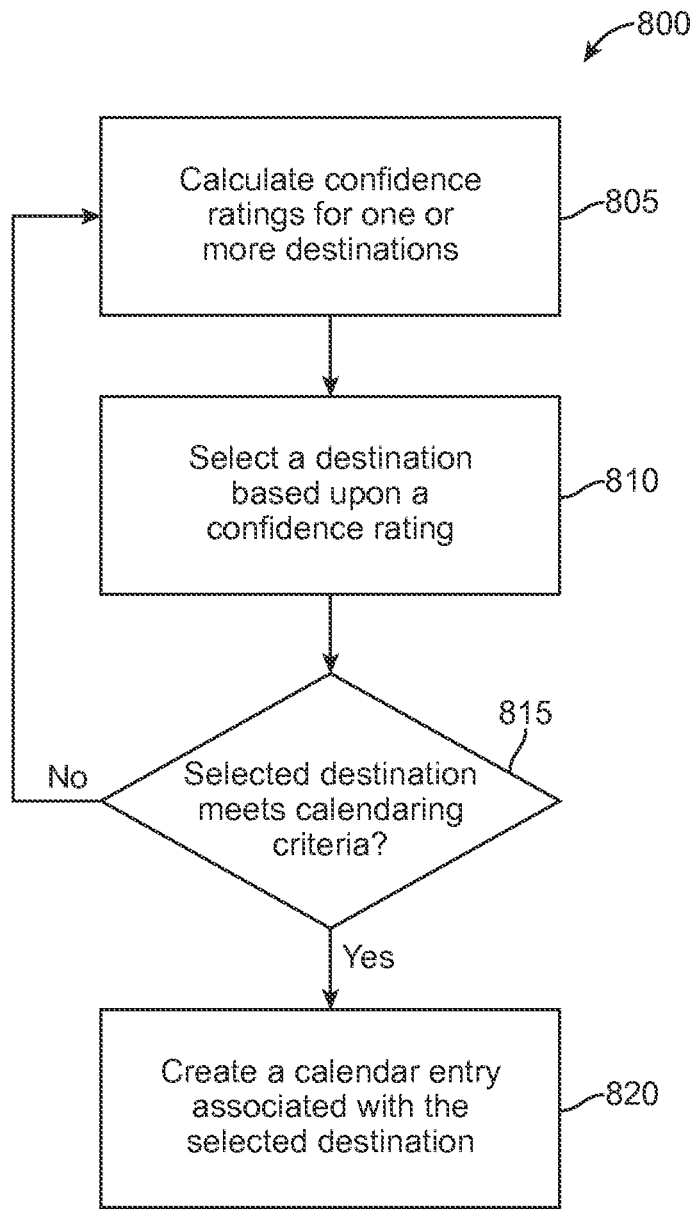
FIG. 8 is a flow diagram of one embodiment of a method for updating a calendar based on intelligent destination recommendations.

FIG. 8 is a flow diagram of one embodiment of a method for updating a calendar based on intelligent destination recommendations. At block 805, the processing device calculates confidence ratings for one or more destinations. In one embodiment, each destination has a confidence rating and the confidence rating is based on a match between the current time and time data for each destination. In one embodiment, the Navigation Module 200 calls the IDRE 204 to calculate confidence ratings based on a match between the current time and stored time stamps for a destination. In one embodiment, the Navigation Module 200 calls the TEE 203 to determine the mode of transportation and the mode of transportation is used to adjust the confidence ratings.

At block 810, the processing device selects a stored destination based upon a confidence rating. In one embodiment, the IDRE 204 returns a destination recommendation that corresponds to the time and historical time stamps for a location (destination).

At block 815, the processing device determines whether the selected destination meets criteria for adding the destination as a calendar entry associated with the destination. In one embodiment, the criteria for selecting calendar entries can include one or more factors such as frequency of visits and/or whether multiple visits are consecutive. In one embodiment, the Calendar Interface Engine 205 determines the criteria is met if the destination has associated time stamps that indicate repeated consecutive visits over a time period. For example, if the destination record contains time stamps for 5 consecutive days, the Calendar Interface Engine 205 may determine the criteria is met, and proceed to block 820 to create the calendar event. In other embodiments, the time period may be a number of weeks, months or other time period.

At block 820, the processing device creates a calendar event for the time based upon the selected destination. In one embodiment, the Navigation Module 200 calls the Calendar Interface Engine 205 to create a calendar entry associated with the selected destination. In one embodiment, the calendar entry associated with the selected destination is a tentative entry.

Example Mobile Device Architecture

Sensors, devices and subsystems can be coupled to the input/output controller 103 facilitate multiple functionalities. For example, a positioning system 113, light sensor 106, motion sensor (accelerometer) 107, or wireless subsystem 108 can be coupled to the input/output controller to provide data input for the mobile device 100. Other sensors 109 can also be connected to the peripherals interface, such as a temperature sensor, a biometric sensor, or other sensing device, to facilitate related functionalities.

The mobile device 100 can, communicate with one or more content publishers over the wired and/or wireless subsystem 108. For example, a navigation service can provide navigation information, e.g., map information, location information, route information, and other information, to a Navigation Module 200 and the mobile device 100. In some embodiments, the Navigation Module 200 can be launched automatically without requiring user input.

Date and time functions can be retrieved from a timekeeping program native to the mobile device 100, the Internet or a peripheral device. The mobile device 100 may receive date and time information from radio waves captured by a radio frequency receiver connected to the peripherals interface.

A camera subsystem and an optical sensor, e.g., a charged coupled device (CCD) or a complementary metal-oxide semiconductor (CMOS) optical sensor, can be utilized to facilitate camera functions.

Communication and location detection functions can be facilitated through one or more wireless communication subsystems, which can include radio frequency receivers and transmitters and/or optical (e.g., infrared) receivers and transmitters. The specific design and embodiment of the communication subsystem can depend on the communication network(s) over which the mobile device 100 is intended to operate. For example, a mobile device 100 may include communication subsystems designed to operate over a CDMA, GSM, GPRS, EDGE, Wi-Fi, 3g, 4g, WiMax or Bluetooth™ network.

An audio subsystem can be coupled to a speaker and a microphone to facilitate voice-enable functions, such as voice recognition, voice replication, digital recording, voice directions and telephony functions.

The Input/Output controller 103 can interface with a touch screen controller and/or other input controller(s). The touch-screen controller can be coupled to a touch screen. The other input controller(s) can be coupled to other input/control devices, such as one or more buttons, dials, knobs, rocker switches, levers, thumb-wheel, infrared port, USB port, and/or a pointer device such as a stylus.

The memory 101 can include high-speed random access memory and/or non-volatile memory, such as one or more magnetic disk storage devices, one or more optical storage devices, and/or flash memory (e.g., NAND, NOR). The memory 101 can store an operating system, such as iOS, Mac OS, Darwin, RTXC, LINUX, UNIX, WINDOWS, or an embedded operating system such as VxWorks. The operating system may include instructions for handling basic system services and for performing hardware dependent tasks. In some embodiments, the operating system can be a kernel (e.g., UNIX kernel). In some embodiments, a particular function as described below may be implemented as two or more pieces of software in memory that are being executed by different hardware units of a processor.

In one embodiment the memory 101 includes Navigation Module 200 instructions to facilitate navigation-related processes and instructions, and/or other software instructions or data to facilitate other related processes and functions. The above identified instructions can correspond to a set of instructions for performing one or more functions described above. These instructions need not be implemented as separate software programs, procedures, engines, or modules. The memory 101 can include additional instructions or fewer instructions. Furthermore, various functions of the mobile device 100 may be implemented in hardware and/or in software, including in one or more signal processing and/or application specific integrated circuits.

Various embodiments and aspects of the inventions have been described above, and the accompanying drawings will illustrate the various embodiments. The foregoing description and drawings are illustrative of the invention and are not to be construed as limiting the invention. Numerous specific details have been described to provide a thorough understanding of various embodiments of the present invention. However, in certain instances, well-known or conventional details have been omitted in order to provide a concise discussion of embodiments of the present inventions.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

The foregoing embodiments of the invention may be described as a process that is usually depicted as a flowchart, a flow diagram, a structure diagram or a block diagram. Although a flowchart may describe the operations as a sequential process, many of the operations may be rearranged. The process is terminated when its operations are completed. A process may correspond to a method, a program, a procedure, etc.

An engine, as the term is used throughout this application, can be a piece of hardware that encapsulates a function, can be firmware or can be a software application. An engine can perform one or more functions, and one piece of hardware, firmware or software can perform the functions of more than one of the engines described herein. Similarly, more than one piece of hardware, firmware and/or software can be used to perform the function of a single engine described herein.

What is claimed is:

1. A machine-implemented method comprising:
   determining, by a mobile device, a current location of the mobile device and an estimated mode of transportation, the estimated mode of transportation being a current mode of transportation;
   calculating, by the mobile device, respective confidence ratings for one or more destinations, wherein the respective confidence ratings for the one or more destinations are calculated based at least in part on the estimated mode of transportation and travel history of the mobile device, wherein calculating the respective confidence ratings for the one or more destinations includes:
      determining a frequency of visits to a destination over a time period and increasing a confidence rating for the destination when one or more timestamps associated with the destination matches a current time;
      accessing a transportation profile, wherein the transportation profile stores associations between modes of transportation and previously visited destinations, the transportation profile including an association between the estimated mode and one or more previously visited destinations; and
      increasing a first confidence rating for a first destination in the one or more destinations when the transportation profile indicates that the first destination corresponds to a previously visited destination associated with the estimated mode of transportation, the increase relative to a second confidence rating for a second destination in the one or more destinations that is not associated with the estimated mode of transportation;
   selecting, by the mobile device, a stored destination based upon a calculated confidence rating, the stored destination being a predicted destination of a user of the mobile device;
   displaying the selected destination in a manner that the user can accept or reject the selected destination;
   determining if the selected destination was rejected;

adjusting, based on the rejection, the confidence rating for the selected destination; and displaying another destination based upon its confidence rating.

2. The machine-implemented method of claim 1 wherein calculating the respective confidence ratings further comprises determining a match between a current time and a time associated with a destination.

3. The machine-implemented method of claim 1 wherein calculating the respective confidence ratings further comprises determining a current location of the mobile device, a current path of travel, and user overrides.

4. The machine-implemented method of claim 3 wherein a frequency in determining a current location of the mobile device is adjusted based on movement of the mobile device.

5. The machine-implemented method of claim 1 further comprising:
receiving input accepting the stored destination; and
determining a route to the stored destination from the current location.

6. The machine-implemented method of claim 1 further comprising:
determining if a route to the selected destination from the current location was rejected;
adjusting the confidence rating for the selected destination; and
displaying a list of destinations ranked in order based upon their confidence ratings.

7. The machine-implemented method of claim 1 further comprising:
determining one or more locations of the mobile device, wherein the stored destination is selected further based upon the one or more locations of the mobile device.

8. The machine-implemented method of claim 7 further comprising:
storing the one or more determined locations; and
storing a time associated with each determined location.

9. The machine-implemented method of claim 1 wherein the stored destination is selected further based upon calendar data.

10. The machine-implemented method of claim 9 further comprising:
storing one or more locations associated with one or more calendar appointments; and
storing a time associated with each location associated with a calendar appointment.

11. The machine-implemented method of claim 10 further comprising:
displaying the selected destination, wherein the display of the stored destination is triggered when a navigation application has been launched.

12. The machine-implemented method of claim 1 further comprising:
routing directions to the selected destination.

13. The machine-implemented method of claim 1 further comprising:
recognizing a vehicle from a connection history between the mobile device and the vehicle; and
selecting a connection mode to the vehicle based on the connection history.

14. The machine-implemented method of claim 1 wherein the estimated mode of transportation is determined to be one of: pedestrian, vehicle, or mass transportation.

15. The machine-implemented method of claim 14 wherein the determination that transportation is walking is based upon one or more of: travel along known walking routes, input from an accelerometer, and input from a pedometer.

16. The machine-implemented method of claim 14 further comprising:
determining that the stored destination is beyond a historical walking range; and
displaying a recommendation to switch to an alternate mode of transportation.

17. The machine-implemented method of claim 16 further comprising:
retrieving a mass transportation schedule for the current time and the stored destination.

18. The machine-implemented method of claim 1 wherein the estimated mode of transportation is determined by analyzing a movement of the mobile device.

19. The machine-implemented method of claim 1 wherein the estimated mode of transportation is determined to be pedestrian and current weather information is displayed.

20. The machine-implemented method of claim 1 wherein the confidence rating for each destination is based upon one or more of a time of day, a day of a week, or a day of a month.

21. The method of claim 1 wherein the travel history of the mobile device includes travel history of the user of the mobile device, and wherein the destination is associated with the estimated mode of transportation in accordance with the travel history of the mobile device when the travel history and the transportation profile indicate that the destination is a previously visited destination that has been reached using the estimated mode of transportation or when the destination is within a corresponding distance associated with the estimated mode of transportation as indicated by the travel history.

22. The method of claim 1, further comprising:
accessing the transportation profile to determine an associated distance for the estimated mode of transportation, the associated distance representing a historical distance traveled using the estimated mode of transportation; and
determining a current location of the mobile device, wherein the respective confidence ratings for the one or more destinations are calculated based at least in part upon a comparison between the associated distance and one or more distances between the current location of the mobile device and the one or more destinations.

23. A machine-implemented method comprising:
calculating, by a processing device, respective confidence ratings for one or more destinations;
selecting a stored destination based upon the respective confidence ratings, wherein the stored destination is associated with one or more timestamps;
determining whether the stored destination meets a criteria for adding the stored destination as a calendar appointment, wherein determining whether the stored destination meets the calendaring criteria includes determining whether the one or more timestamps associated with the stored destination exceeds a threshold number of visits over a time period;
upon determining that the stored destination meets the calendaring criteria for adding the stored destination as the calendar appointment, creating the calendar appointment associated with the stored destination;
determining if the calendar appointment associated with the stored destination was rejected;
adjusting, based on the rejection, the confidence rating for the stored destination; and
creating another calendar appointment associated with another stored destination that meets the calendaring criteria.

24. The machine-implemented method of claim 23 further comprising:

displaying the calendar appointment in a manner that a user can accept or reject the calendar appointment as a scheduled calendar appointment.

25. The machine-implemented method of claim 23 wherein the calendar appointment is stored as a tentative appointment in a calendar.

26. The machine-implemented method of claim 23 wherein the calendar appointment is shared with a plurality of subscribers.

27. The machine-implemented method of claim 23 wherein the one or more destinations and the historical time data are determined from calendar data.

28. The method of claim 23 wherein the criteria is determined to be met when the destination includes associated time stamps that indicate at least one of repeated or consecutive visits over the time period.

29. The method of claim 23, wherein determining whether the stored destination meets the calendaring criteria includes determining whether the one or more timestamps associated with the stored destination exceeds at least one of a frequency threshold or a consecutive visit threshold over the time period.

30. A data processing device comprising:
a processor;
a storage device coupled to the processor and configurable for storing instructions, which, when executed by the processor cause the data processing device to:
obtain a current time;
determine a current location of the data processing device and an estimated mode of transportation, wherein the estimated mode of transportation is a current mode of transportation;
calculate respective confidence ratings for one or more destinations, wherein calculating the respective confidence ratings for the one or more destinations includes determining a frequency of visits to a destination over a time period and increasing a confidence rating for a destination in the one or more destinations when one or more timestamps associated with the destination matches the current time;
adjust the respective confidence ratings for the one or more destinations based on the estimated mode of transportation, wherein the adjusted confidence ratings are used to select a predicted destination of a user;
select a stored destination based upon the confidence ratings;
display the selected destination in a manner that a user can accept or reject the selected destination, wherein the display of the selected destination is triggered by the confidence rating for the selected destination being greater than a threshold value;
determine if the selected destination was rejected;
adjust, based on the rejection, the confidence rating for the selected destination; and
display another destination having a confidence rating greater than the threshold value.

31. The data processing device of claim 30 wherein the stored destination data is selected further based upon a location of the processing device.

32. The data processing device of claim 30 wherein the processor is further configured to:
determine one or more locations of the processing device;
store the one or more determined locations; and
store a time associated with each determined location.

33. A data processing device of claim 32 wherein the estimated mode of transportation is determined by analyzing a movement of the mobile device.

34. The data processing device of claim 30, wherein calculating the one or more confidence ratings for the one or more destinations includes increasing a confidence rating for a destination in the one or more destinations when the frequency of visits to the destination over the time period indicates repeated consecutive visits over the time period.

35. A data processing device comprising:
a processor;
a storage device coupled to the processor and configurable for storing instructions, which, when executed by the processor cause the processor to:
obtain a current time;
calculate respective confidence ratings for one or more destinations wherein calculating the respective confidence ratings for the one or more destinations includes determining a number of visits to a destination over a time period and increasing a confidence rating for a destination in the one or more destinations when one or more timestamps associated with the destination matches the current time;
select a stored destination based upon the confidence ratings;
determine whether the stored destination meets a criteria for adding the stored destination as a calendar appointment;
create the calendar appointment for the time based upon the stored destination upon determining that the stored destination meets the criteria for adding the stored destination as the calendar appointment;
determine if the calendar appointment was rejected;
adjust, based on the rejection, the confidence rating for the stored destination; and
create another calendar appointment associated with another stored destination that meets the calendaring criteria.

36. A data processing device of claim 35 wherein the processor is further configured to:
recognize a vehicle from a connection history between the processing device and the vehicle; and
select a connection mode to the vehicle based on the connection history.

37. A non-transitory computer readable storage medium containing executable program instructions which when executed cause a data processing device to perform a method comprising:
determining a current location of the data processing device and an estimated mode of transportation that is a current mode of transportation;
calculating respective confidence ratings for one or more destinations, wherein the respective confidence ratings for the one or more destinations are calculated based at least in part on the estimated mode of transportation and travel history of the data processing device, wherein calculating the respective confidence ratings for the one or more destinations includes:
determining a frequency of visits to a destination over a time period and increasing a confidence rating for the destination when one or more timestamps associated with the destination matches a current time;
accessing a transportation profile, wherein the transportation profile stores associations between modes of transportation and previously visited destinations, the transportation profile including an association between the estimated mode and one or more previously visited destinations; and increasing a first confidence rating for a first destination in the one or more destinations when the transportation profile indicates that the first destination corresponds to a previously visited destination associated with the estimated mode of transportation, the increase relative to a second confidence rating for a second destination in the one or more destinations that is not associated with the estimated mode of transportation;

selecting a selected destination based upon the confidence ratings;

displaying the selected destination in a manner that a user can accept or reject the selected destination;

determining if the selected destination was rejected;

adjusting, based on the rejection, the confidence rating for the selected destination; and displaying another destination based upon its confidence rating.

38. The computer readable storage medium of claim 37 wherein displaying the stored destination is triggered by the processing device detecting a proximity to a mode of transportation.

39. The computer readable storage medium of claim 37 wherein the method further comprises:
   receiving input accepting the selected destination; and
   determining a route to the selected destination from the current location.

40. The computer readable storage medium of claim 39 wherein the method further comprises:
   presenting an option to display a map of the determined route.

41. The computer readable storage medium of claim 37 wherein the method further comprises:
   determining if a route to the selected destination from the current location was rejected;
   adjusting the confidence rating for the selected destination; and
   displaying a list of destinations ranked in order based upon the confidence ratings.

42. A non-transitory computer readable storage medium containing executable program instructions which when executed cause a data processing device to perform a method comprising:
   calculating respective confidence ratings for one or more destinations;
   selecting a stored destination based upon the respective confidence ratings, wherein the stored destination is associated with one or more timestamps;
   displaying the stored destination in a manner that a user can accept or reject the stored destination;
   determining whether the stored destination meets a criteria for adding the stored destination as a calendar appointment, wherein determining whether the stored destination meets the calendaring criteria includes determining whether the one or more timestamps associated with the stored destination exceeds a threshold number of visits over a time period; and
   upon determining that the stored destination meets the calendaring criteria for adding the stored destination as the calendar appointment, creating the calendar appointment associated with the stored destination;
   determining if the calendar appointment associated with the stored destination was rejected;
   adjusting, based on the rejection, the confidence rating for the stored destination; and
   creating another calendar appointment associated with another stored destination that meets the calendaring criteria.

43. The computer readable storage medium of claim 42 wherein the method further comprises:
   displaying the calendar appointment in a manner that the user can accept or reject the calendar appointment as a scheduled calendar appointment.

44. The computer readable storage medium of claim 42 wherein the calendar appointment is stored as a tentative appointment in the calendar.

45. The computer readable storage medium of claim 42 wherein the calendar appointment is shared with a plurality of subscribers.

46. The computer readable storage medium of claim 42 wherein the one or more destinations and the historical time data are determined from calendar data.

47. An apparatus comprising:
   means for determining a current time;
   means for determining a current location of the apparatus and an estimated mode of transportation that is a current mode of transportation;
   means for calculating respective confidence ratings for one or more destinations, wherein calculating the respective confidence ratings for the one or more destinations includes determining a frequency of visits to a destination over a time period and increasing a confidence rating for a destination in the one or more destinations when one or more timestamps associated with the destination matches the current time;
   means for adjusting the confidence ratings based on the estimated mode of transportation, wherein the adjusted confidence ratings are used to select a predicted destination of a user;
   means for selecting a stored destination based upon the respective confidence ratings, the stored destination being a predicted destination of a user;
   means for displaying the selected destination in a manner that the user can accept or reject the selected destination;
   means for determining if the selected destination from the current location was rejected;
   means for adjusting, based on the rejection, the confidence rating for the selected destination; and
   means for displaying another destination based upon its confidence rating.

48. An apparatus comprising:
   means for calculating respective confidence ratings for one or more destinations;
   means for selecting a stored destination based upon the respective confidence ratings, wherein the stored destination is associated with one or more timestamps;
   means for displaying the stored destination in a manner that a user can accept or reject the stored destination;
   means for determining whether the stored destination meets a criteria for adding the stored destination as a calendar appointment, wherein determining whether the stored destination meets the calendaring criteria includes determining whether the one or more timestamps associated with the stored destination exceeds a threshold number of visits over a time period;
   means for, upon determining that the stored destination meets the calendaring criteria for adding the stored destination as the calendar appointment, creating the calendar appointment associated with the stored destination;
   means for determining if the calendar appointment associated with the stored destination was rejected;

means for adjusting, based on the rejection, the confidence rating for the stored destination; and means for creating another calendar appointment associated with another stored destination that meets the calendaring criteria.

\* \* \* \* \*